UNITED STATES PATENT OFFICE.

ADOLFO PESSI, OF TRIESTE, ITALY.

COMPOSITION FOR PREVENTING INCRUSTATION IN STEAM-BOILERS.

1,399,651. Specification of Letters Patent. Patented Dec. 6, 1921.

No Drawing. Application filed June 16, 1921. Serial No. 478,099.

*To all whom it may concern:*

Be it known that I, ADOLFO PESSI, a subject of the King of Italy, and residing at 6 viale della III Armata, Trieste, Italy, have invented certain new and useful Improvements in Compositions for Preventing Incrustation in Steam-Boilers, of which the following is a specification, and for which I filed application for patent in Italy, May 6, 1920.

Ever since steam engines have been used it has been important to employ water of such chemical composition as to avoid the serious disadvantages caused in the boilers by the rapid formation of incrustations or scale.

The dangerous accidents which are liable to occur on account of the excessive deposit of mineral substances and, although in smaller quantities, of substances of a fatty nature, and above all the enormous consumption of fuel for heating purposes, which may increase to about 50% above the normal when the deposit has reached a thickness of about 7 mm., have rendered it necessary to find chemical and physical means to avoid these drawbacks.

Many methods have been proposed, but none has proved entirely satisfactory. Numerous experiments have been made with alkaline salts, with liquids of an acid nature, and with mineral, vegetable and animal oils. Good results have been obtained when using lubricating oils, but also these create drawbacks on account of the emulsions produced and further on account of their ready decomposition.

Now, numerous experiments have shown that good results may be obtained by adding to the water in the boiler a mixture of pyroligneous acid, soda and arsenious anhydrid, these substances being mixed in suitable proportions which, however, may vary in accordance with the composition of the water to be treated. Of course, acetates or arsenites of alkali or alkaline earths may be used, if desired in addition to the pyroligenous acid and soda.

With hard water the following mixture in aqueous solution has been found to give good results: crude pyroligneous acid 20–40%, soda 10–30%, arsenious anhydrid 0.5–1.5%, or also acetates and pyrolignites of alkali or alkaline earths 3–6%, soda 10–30%, arsenious anhydrid 0.5–1.5%.

The mixtures according to the invention keep the metallic walls of the boilers clean and prevent the formation of incrustations, which are sometimes hard masses of mineral substances accompanied by an abundant foam produced by the fatty substances.

The soda saponifies the fats and the resulting acids form soluble salts. The pyroligneous acid and the arsenious anhydrid or the pyrolignites (acetates) and arsenites have no objectionable action on the metallic walls of the boiler while they are apt, on account of the reactions set up by them, to diminish greatly the incrustations and to prevent their formation.

What I claim is:

A disincrustant for steam boilers, the constituent ingredients of which are 20–40% of crude pyroligneous acid, 10–30% of soda, and 0.5–1.5% of arsenious anhydrid.

In testimony whereof I have signed my name at Trieste, Italy, this 23d day of May 1921 in the presence of two subscribing witnesses.

ADOLFO PESSI.

Witnesses:
 KAPPS ARTSEL,
 ERNEST SPINO.